United States Patent [19]

Sutphen

[11] Patent Number: 4,741,569
[45] Date of Patent: May 3, 1988

[54] INFLATABLE DRAG REDUCER FOR LAND TRANSPORT VEHICLES

[76] Inventor: Paul F. Sutphen, 309 S. State St., Owosso, Mich. 48867

[21] Appl. No.: 4,130

[22] Filed: Mar. 4, 1987

[51] Int. Cl.$^4$ .............................................. B62D 35/00
[52] U.S. Cl. ...................................................... 296/1 S
[58] Field of Search ......................................... 296/1 S

[56] References Cited

U.S. PATENT DOCUMENTS

| | | | |
|---|---|---|---|
| 4,006,932 | 2/1977 | McDonald | 296/1 S |
| 4,236,745 | 12/1980 | Davis | 296/1 S |
| 4,601,508 | 7/1986 | Kerian | 296/1 S |

Primary Examiner—Robert R. Song
Attorney, Agent, or Firm—Price, Heneveld, Cooper, DeWitt & Litton

[57] ABSTRACT

An inflatable rear fairing to reduce drag incident to highway speed movement of box like trucks and trailers. The invention attaches, in one or more sections, to the rear door(s) of the vehicle and when inflated form an apex at its rear, to minimize the wind resistance of the vortex which normally forms at the rear of a square backed truck. The invention flattens, when deflated, to allow easy access for loading or unloading the vehicle.

1 Claim, 3 Drawing Sheets

INFLATABLE DRAG REDUCER FOR LAND TRANSPORT VEHICLES

BACKGROUND OF THE INVENTION

This invention relates to reducing air drag on the rear surface of box shaped transport vehicles.

The ideal shape for the least aerodynamic drag would be the teardrop-rounded in front and pointed in the rear. However transport vehicles have been designed for cargo volume and structural strength. With the possible exception of the streamlined train, that recognized aerodynamic drag with their relative early speeds, transporting vehicles accepted the basic box shapes as cargo effective. Engines of sufficient power with multi speed transmissions overcame the aerodynamic drag and not until the increase in fuel costs did the effort to reduce drag begin in earnest. Since that time many deflector type devices have been used to provide the smoothed flow of air over the front of the vehicle. These proved to reduce drag and therefore saved fuel. Some attempts have been made to reduce drag, caused by the low pressure separated wake behind the vehicle, which is an important contributor to aerodynamic drag. Some of these attempts have proven too expensive or too complicated due to access requirements to the cargo via the rear doors of the vehicle.

SUMMARY OF THE INVENTION

The object of the present invention is to provide a device which will reduce air drag on the rear surface of the transporting vehicle to improve fuel economy. This will be possible by inflation of air bags on the rear doors of the vehicle, which change the flat surface into an aerodynamic shape. These air bags, of strong but light weight non poros material, are attached near the hinge of the door and at a point short of the door handle mechanism. A vehicle with dual door design will have a pair of bags designed to meet at the center of the rear of the vehicle after inflation. This forms the aerodynamic shape which allows the air to flow past the vehicle without a vortex of turbulence and the resultant drag.

The design of the invention made of strong material and of "air bag" construction, allows easy access to the cargo by deflating the bags. The flattened bags, on the face of the door(s), allow the door(s) to swing to the normal stored position, against the vehicle side for close quarters parking. After loading and closing the door(s) the bag(s) can be quickly realigned for drag reduction by filling them with compressed air.

An alternate inflation method would use a small built in 12 volt blower motor with manifold positions for inflation or evacuation of the air bag(s).

DETAILED DESCRIPTION OF THE DRAWINGS

The wording 'truck afterbody' is to be understood to refer to the aft portion of the body of an articulated or nonarticulated truck. For example the truck afterbody shown in FIG. 1 may be the afterbody of the trailer box of a tractor-trailer truck or the aft portion of the body of a nonarticulated truck.

Figure 1:
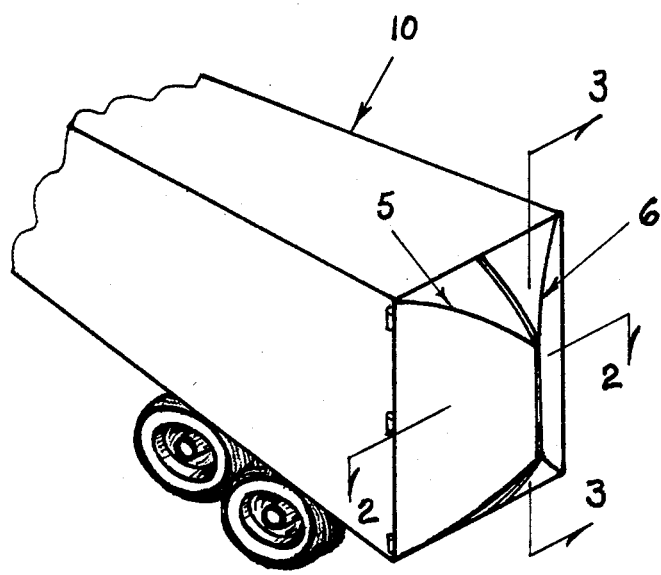
FIG. 1 shows an isometric view of an embodiment of the invention as employed on a tractor trailer, viewed from behind to the left, and above the truck afterbody.
Figure 2:
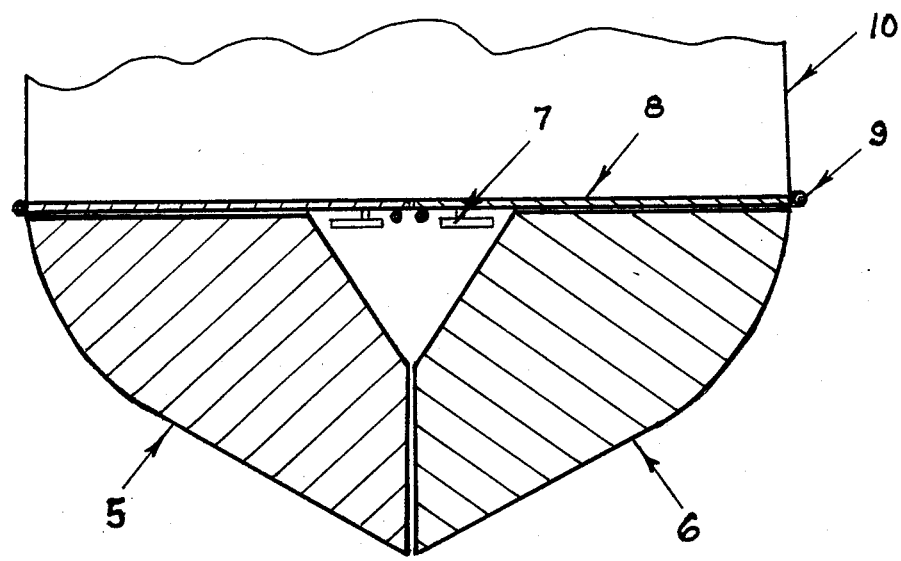
FIGS. 2 and 3 show horizontal and vertical cross-sectional views of a truck afterbody equipped with embodiments of the present invention. The horizontal cross-section plate lies just below the center hinge of the after body. The verticle cross-section plane (FIG. 3) lies just to the right of the centerline, between air bag members 5 and 6, through air bag 6.
Figure 2A:
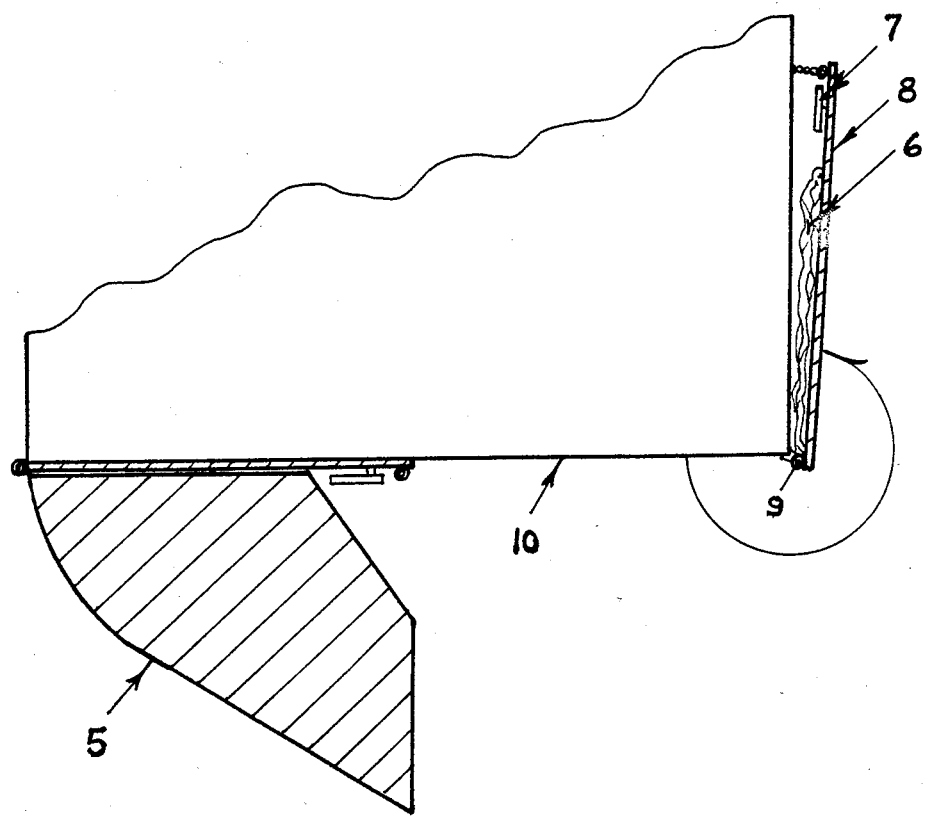
FIG. 2A shows air bag 6 deflated and door 8 opened and latched back to the side of afterbody 10, with the air bag 6 between the door and the side of the afterbody. No detachment of the air bag is required, only deflation.

Referring now to the drawings wherein reference characters designate like or corresponding parts throughout the several views, there is shown in FIG. 1 an afterbody 10 with an emobodiment of the drag reducer attached. This embodiment has air bags 5 and 6 (left hand and right hand to form a pair) shown in the inflated position. Each half of the drag reducer is attached to it's respective door and is independent of the other. FIG. 2 shows the design and attachment (contact) surface of the bag to the door, allowing clearance for the door handles and easy acess, when a bag is deflated, to open the door. FIG. 2A shows air bag 6 deflated and door 8 opened by using handle 7 and swung on hinges 9 to the stored position next to the sides of the vehicle 10. This FIG. 2A shows left air bag 5 in the inflated position. It is not necessary to deflate both sides when only one door needs to be opened.

Figure 3:
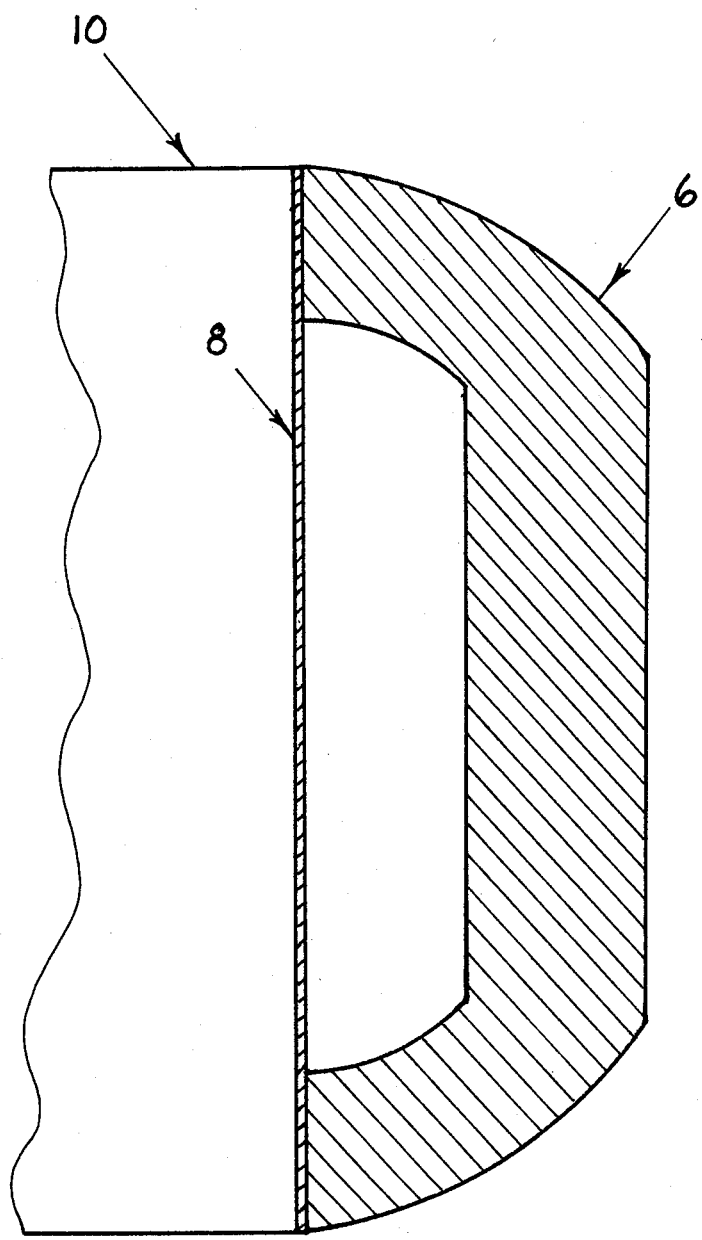

Other embodiments of the invention would attach the air bags (or a single air bag of overall shape) to overhead door which would always require complete deflation to raise door but not removal of bag(s). FIG. 3 shows the vertical cross-section of air bag 6 showing the relief from the top and bottom (external) curving to the vertical face at a distance approximately one third of the distance from the top to the bottom of the afterbody 10. This shape allows the air to move smoothly to the rear without turbulence and on the bottom also provides extra clearance when backing into a dock.

REFERENCES CITED

| U.S. Parent Documents | | | |
| --- | --- | --- | --- |
| 4,257,641 | 3/1981 | Keedy | 296/1S |
| 4,236,745 | 12/1980 | Davis | 296/1S |
| 4,006,932 | 2/1977 | McDonald | 296/1S |

I claim:

1. A streamlining inflatable attachment for truck afterbodies including a pair of rearwardly facing doors having flat surfaces, hinges on outward sides thereof and adjacent door handles on inward sides thereof, said attachment comprising: a pair of air bags which attach one to each of said doors on said flat surfaces thereof; each of said bags having a first surface extending from a first point at the hinge side of the respective one of said doors toward the center of the truck to a second point short of the respective one of said door handle, a second surface extending from said second point rearwardly and inwardly to a third point at the center of said truck and adjacent the other one of said bags, a third surface extending from said third point rearwardly to a fourth point and a fourth surface extending from said fourth point outwardly and forwardly to said first point, said fourth surfaces of said bags forming an apex rearward of the truck to reduce air drag on the rear surface of the truck, said second surfaces and said doors defining a chamber to accommodate the door handles and latch mechanism of each door and to substantially reduce the inflated volume of each bag.

* * * * *